(12) United States Patent
Litingtun et al.

(10) Patent No.: US 8,098,051 B2
(45) Date of Patent: Jan. 17, 2012

(54) TEMPERATURE-BASED CHARGE AND DISCHARGE CONTROL FOR A BATTERY

(75) Inventors: Siong Litingtun, Kitchener (CA); Jacek S. Idzik, Kenilworth (CA)

(73) Assignee: Research In Motion Limited, Waterloo (CA)

( * ) Notice: Subject to any disclaimer, the term of this patent is extended or adjusted under 35 U.S.C. 154(b) by 0 days.

(21) Appl. No.: 12/860,992

(22) Filed: Aug. 23, 2010

(65) Prior Publication Data

US 2011/0018501 A1   Jan. 27, 2011

Related U.S. Application Data

(63) Continuation of application No. 11/459,434, filed on Jul. 24, 2006, now Pat. No. 7,808,212.

(51) Int. Cl.
*H02J 7/00* (2006.01)
*H02J 7/16* (2006.01)

(52) U.S. Cl. ........ 320/150; 320/153; 320/134; 320/151; 320/148; 320/136

(58) Field of Classification Search ............. 320/134, 320/150, 135, 136, 127, 128, 137, 148, 149, 320/151, 152, 153, 154
See application file for complete search history.

(56) References Cited

U.S. PATENT DOCUMENTS

| | | | |
|---|---|---|---|
| 5,557,188 A | 9/1996 | Piercey | |
| 5,563,496 A * | 10/1996 | McClure | 320/128 |
| 5,608,304 A | 3/1997 | Okumura | |
| 5,645,949 A | 7/1997 | Young | |
| 5,731,686 A | 3/1998 | Malhi | |
| 5,825,155 A | 10/1998 | Ito et al. | |
| 5,963,019 A | 10/1999 | Cheon | |
| 6,340,880 B1 * | 1/2002 | Higashijima et al. | 320/162 |
| 6,804,100 B2 | 10/2004 | Astala | |
| 6,879,133 B1 | 4/2005 | Geren | |
| 6,992,463 B2 * | 1/2006 | Yoshio | 320/134 |
| 7,098,626 B2 | 8/2006 | Seo et al. | |
| 2001/0021092 A1 * | 9/2001 | Astala | 361/90 |
| 2003/0141848 A1 * | 7/2003 | Fujiwara | 320/134 |
| 2004/0135552 A1 | 7/2004 | Wolin et al. | |
| 2004/0212350 A1 * | 10/2004 | Patino et al. | 320/134 |

(Continued)

FOREIGN PATENT DOCUMENTS

CA   2594608   6/2010

(Continued)

*Primary Examiner* — Melissa Koval
*Assistant Examiner* — Alexis Boateng
(74) *Attorney, Agent, or Firm* — Joseph Conneely; McCarthy Tetrault LLP

(57) ABSTRACT

A protection circuit for a battery pack, comprising: a thermistor for indicating a temperature of a cell in the battery pack; a first comparator coupled to the thermistor for determining whether the temperature has exceeded a charge cut-off temperature threshold for the cell, and if so, for turning off a first switch in series with the cell to prevent charging of the cell; and, a second comparator coupled to the thermistor for determining whether the temperature has exceeded a discharge cut-off temperature threshold for the cell, and if so, for turning off a second switch in series with the cell to prevent discharging of the cell.

20 Claims, 6 Drawing Sheets

U.S. PATENT DOCUMENTS

| | | |
|---|---|---|
| 2005/0154574 A1 | 7/2005 | Takemura et al. |
| 2005/0156574 A1* | 7/2005 | Sato et al. ............... 320/134 |
| 2005/0212483 A1 | 9/2005 | Li |
| 2005/0225289 A1* | 10/2005 | Iida et al. ............... 320/116 |
| 2006/0176025 A1* | 8/2006 | Mori et al. ............... 320/134 |
| 2007/0164709 A1 | 7/2007 | Tsubaki et al. |
| 2008/0018304 A1* | 1/2008 | Litingtun et al. ............... 320/134 |

FOREIGN PATENT DOCUMENTS

| | | |
|---|---|---|
| EP | 1 531 535 | 5/2005 |
| EP | 1 758 226 | 2/2007 |
| EP | 1 883 143 | 12/2009 |
| JP | 11215716 | 8/1999 |
| WO | WO 2005/124964 | 12/2005 |

* cited by examiner

TEMPERATURE-BASED CHARGE AND DISCHARGE CONTROL FOR A BATTERY

This application is a continuation of U.S. patent application Ser. No. 11/459,434, filed Jul. 24, 2006 now U.S. Pat. No. 7,808,212, and incorporated herein by reference.

FIELD OF THE APPLICATION

This application relates to the field of batteries, and more specifically, to temperature-based charge and discharge control for batteries of wireless communication devices.

BACKGROUND

Current wireless mobile communication devices include microprocessors, memory, soundcards, and run one or more software applications. Examples of software applications used in these wireless devices include micro-browsers, address books, electronic mail ("email") clients, and instant messaging ("IM") clients. Additionally, wireless devices have access to a plurality of services via the Internet. A wireless device may, for example, be used to browse web sites on the Internet, to transmit and receive graphics, and to execute streaming audio and/or video applications.

Wireless devices are typically supplied with a battery pack, which includes one or more cells forming a battery, for providing power to the wireless device. Such batteries typically include one or more lithium-ion ("Li-Ion") or lithium-ion polymer cells.

Emerging standards (e.g., IEEE Livium™ 1725 "Standard for Rechargeable Batteries for Cellular Telephones") for wireless devices such as cellular telephones require that the charging of batteries be inhibited at a given temperature and that the discharging of batteries (i.e., normal use) be inhibited at a somewhat higher temperature. Currently, this function is typically performed by hardware, software, or firmware control means included in the wireless device. Such standards also require that external chargers implement their own independent checks of these temperature limits. Thus, current battery temperature monitoring solutions use hardware, software, or firmware control means within the wireless device and/or external charger to read the battery pack temperature in order to determine whether to begin charging the battery (i.e., if the user wants to charge the battery) and to determine when to stop using (i.e., discharging) the battery.

Now, new chemistry batteries tend to have different charge/discharge limits than those of existing batteries. This can be problematic in that it requires the wireless device and battery charger to correctly identify the battery pack and to include means such as a lookup table to implement the new charge/discharge limits. These requirements increase the processing requirements and hence the cost of wireless devices and battery chargers. This is especially onerous for battery charger manufacturers who try to limit the cost of their devices by, for example, limiting the capacity of processors included in their devices.

A need therefore exists for improved temperature-based charge and discharge control for batteries of wireless communication devices. Accordingly, a solution that addresses, at least in part, the above and other shortcomings is desired.

BRIEF DESCRIPTION OF THE DRAWINGS

Further features and advantages of the embodiments of the present application will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENTS

Figure 1:
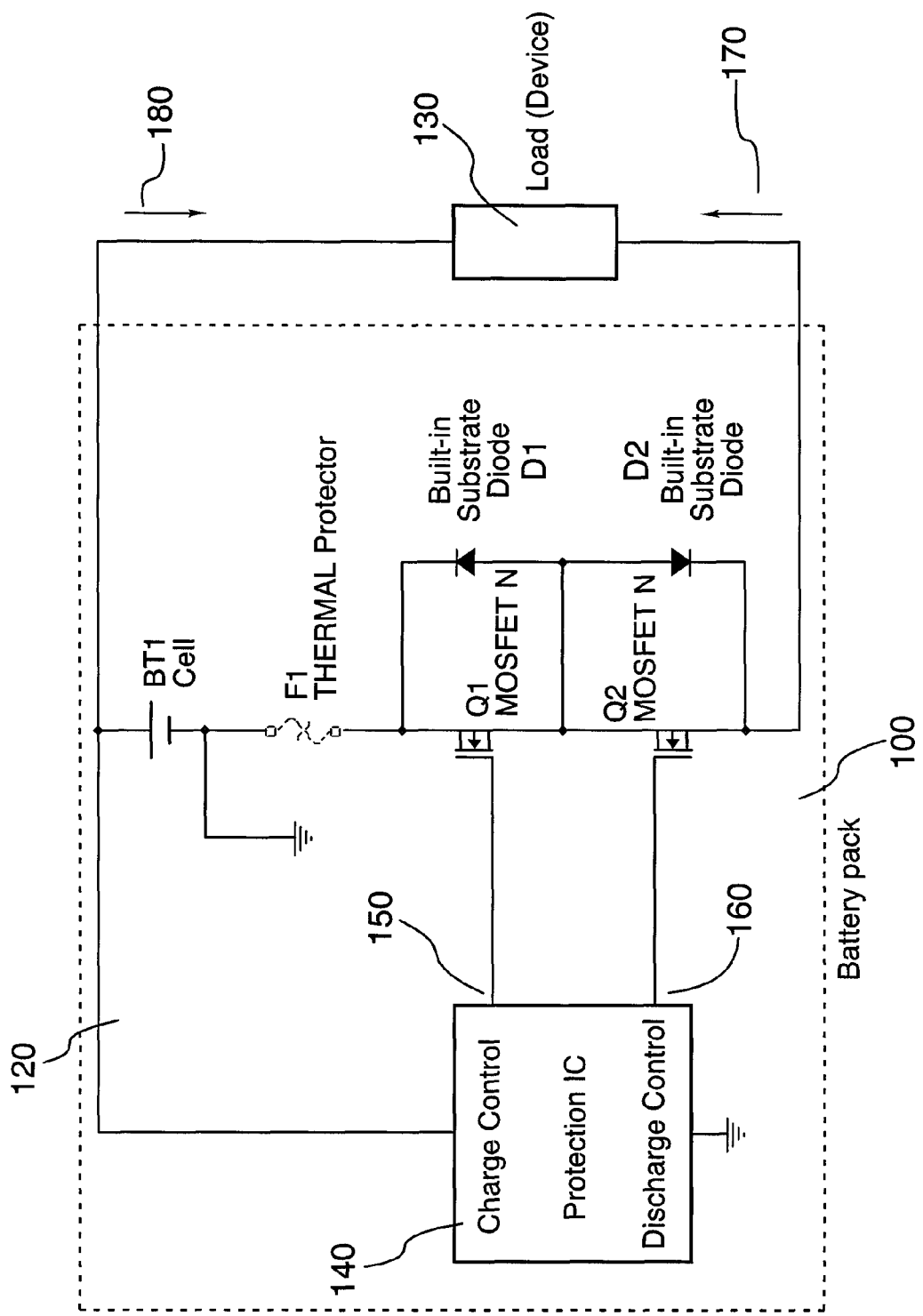
FIG. 1 is a circuit diagram illustrating a protection circuit for a battery pack.

In the following description, details are set forth to provide an understanding of the application. In some instances, certain software, circuits, structures and techniques have not been described or shown in detail in order not to obscure the application.

The present application provides a temperature-based charge and discharge protection circuit that is contained within a battery pack rather that in a wireless device or external charger. In doing so, the burden of control processing is removed from the wireless device and charger. To perform its protection function, the battery pack makes use of protection switches (e.g., charge/discharge control metal-oxide semiconductor field-effect transistors ("MOSFETS")) that may be already included in the battery pack by way of a cost effective hardware modification. The present application thus provides a battery pack with self-contained temperature-based charge/discharge protection functionality.

According to one aspect of the application, there is provided a protection circuit for a battery pack, comprising: a thermistor for indicating a temperature of a cell in the battery pack; a first comparator coupled to the thermistor for determining whether the temperature has exceeded a charge cut-off temperature threshold for the cell, and if so, for turning off a first switch in series with the cell to prevent charging of the cell; and, a second comparator coupled to the thermistor for determining whether the temperature has exceeded a discharge cut-off temperature threshold for the cell, and if so, for turning off a second switch in series with the cell to prevent discharging of the cell.

According to another aspect of the application, there is provided a method for controlling charging and discharging of a battery pack, comprising: receiving from a thermistor a temperature of a cell in the battery pack; determining with a first comparator coupled to the thermistor whether the temperature has exceeded a charge cut-off temperature threshold for the cell, and if so, turning off a first switch in series with the cell to prevent charging of the cell; and, determining with a second comparator coupled to the thermistor whether the temperature has exceeded a discharge cut-off temperature threshold for the cell, and if so, turning off a second switch in series with the cell to prevent discharging of the cell.

As mentioned above, wireless handheld devices such as cellular telephones, personal digital assistants ("PDAs"), etc., are typically powered by Li-Ion battery packs. These packs generally contain one or more Li-Ion cells together with some kind of protection circuit module ("PCM"). The purpose of the PCM is to protect the user from potentially dangerous situations that can arise from the use of Li-Ion cells. The advantage of using Li-Ion cells is primarily one of energy density. At present, Li-Ion cells have the highest energy density level of all common rechargeable battery types. One disadvantage of Li-Ion cells is that they have to be operated within fairly well defined physical and environmental limits in order to avoid catastrophic instability which may lead to fire or explosion.

FIG. 1 is a circuit diagram illustrating a protection circuit 120 for a battery pack 100. The battery pack 100 includes a battery or cell BT1 (e.g., a Li-Ion cell or battery). The protection circuit 120 may be referred to as a protection circuit module ("PCM"). The PCM 120 includes a protection integrated circuit 140 that provides a charge control signal and a discharge control signal through respective outputs 150, 160 to respective MOSFET switches Q1, Q2 in the charge 170 and discharge 180 paths of the battery 120. The battery pack 100 is for providing power to a load or device 130, typically, a wireless device. During charging, the device 130 may be replaced with a battery charger, or, the device 130 may include a battery charger. The diodes D1, D2 may be inherently formed (i.e., they may be built-in substrate diodes) as part of the MOSFETS Q1, Q2, respectively, and function to prevent current flow in their respective MOSFET when that MOSFET is turned off. A thermal protector F1 is coupled to the battery BT1 in the charge/discharge path 170, 180.

Figure 2:
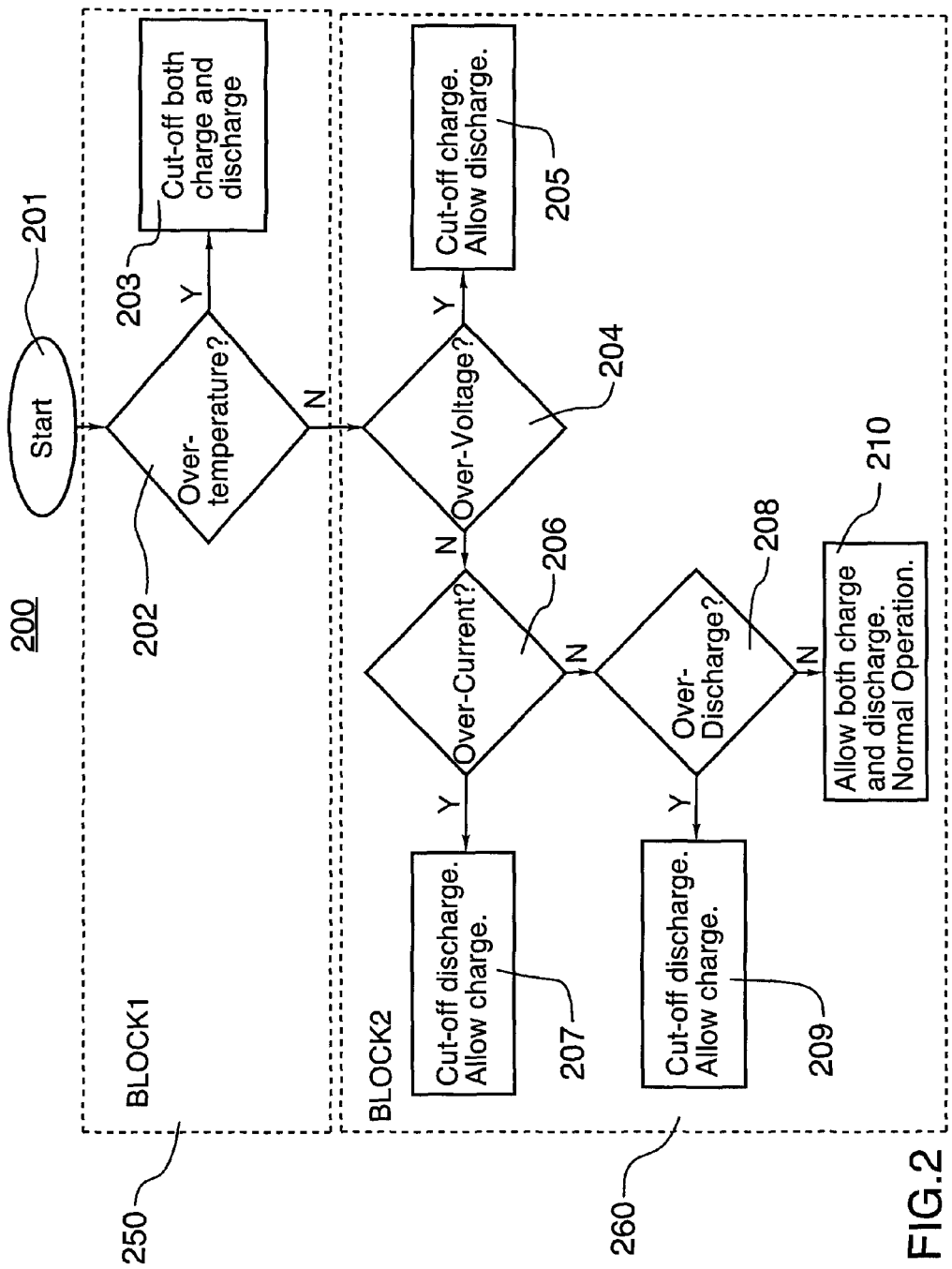
FIG. 2 is a flowchart illustrating operations of the protection circuit of FIG. 1.

FIG. 2 is a flowchart illustrating operations 200 of the protection circuit 120 of FIG. 1. The operations 200 are divided into two blocks of operations, namely, Block1 250 and Block2 260. The operations of Block1 250 are performed by the thermal protector F1 and hence the electronic switches Q1, Q2 are not used. The operations of Block2 260 are performed by the protection IC 140 within the PCM 120

At step 201, the operations 200 start.

At step 202 of Block1 250, a determination is made as to whether a over-temperature condition exists.

At step 203, if an over-temperature condition exists, then charging and discharging is cut-off (i.e., the thermal protector F1 operates by, for example, opening).

At step 204 of Block2 260, a determination is made as to whether an over-voltage condition exists.

At step 205, if an over-voltage condition exists, then charging is cut-off (i.e., MOSFET Q1 is turned off) but discharging is allowed.

At step 206, a determination is made as to whether an over-current condition exists.

At step 207, if an over-current condition exists, then discharging is cut-off (i.e., MOSFET Q2 is turned off) but charging is allowed.

At step 208, a determination is made as to whether an over-discharge condition exists.

At step 209, if an over-discharge condition exists, then discharging is cut-off (i.e., MOSFET Q2 is turned off) but charging is allowed.

At step 210, if an over-discharge condition does not exist, then both charging and discharging are allowed (i.e., normal operation).

The PCM 120 is therefore an essential part of a Li-Ion battery pack 100. The PCM 120 may be paired with a Li-Ion cell 110 in an external enclosure, or encapsulated with the cell 110 itself. The main role of the PCM 120 is to avoid over-charging, over-discharging, over-current, and over-temperature operations. In typical PCM architectures (e.g., 120), a single protection IC 140 provides overcharge, over-discharge and over-current protection functions. Such IC's are available from several manufacturers, each having its own minor variations. In all cases, the primary function of the IC 140 is to disconnect the device 130 from either charging or discharging or both when a fault occurs. Since the IC 140 is very small, and cannot handle the large currents that a device 130 may require, it operates by controlling a pair of electronic switches or MOSFETS Q1, Q2.

In a typical PCM 120 the temperature limit function is performed by a separate component generally known as a thermal protector F1. Thermal protectors F1 come in many variations, each with its own set of advantages and disadvantages. They all share a common feature in that when they trip, the battery pack 100 effectively disconnects from the outside world (i.e., from the device 130). This single trip point means that the cell BT1 can neither be charged nor discharged when the thermal protector F1 activates.

Current Li-Ion cells BT1 typically have a much lower permissible temperature limit for charging 170 than for discharging 180. The single trip point of thermal protectors F1 is therefore selected to be quite high, and its sole function is to prevent catastrophic thermal runaway in the battery pack 100. The determination as to what temperature to prevent charging and discharging at (i.e., normal use) is therefore left to the device 130, whether it be a wireless device and/or a charger.

As such, most devices 130 (i.e., wireless devices and/or chargers) must have means for measuring the temperature of the cell BT1 and means for making a decision as to whether to use the cell BT1 or, in the case of a charger, to recharge the cell BT1. This leads to several disadvantages as follows. First, the device or charger 130 must be able to read the temperature of the cell TB1. Second, the decision to use the cell BT1 is typically made by software running in the device 130 and as such there is always the possibility that a software bug will cause unintentional access to the battery pack 100. Third, Li-Ion cells are continuously improving, and new types have different temperature limits. This forces the device 130 to somehow identify the pack 100 in order to apply the proper limits to that particular pack. This is particularly onerous for chargers that must be designed to be low-cost and have low complexity in order to be price competitive.

Figure 3:
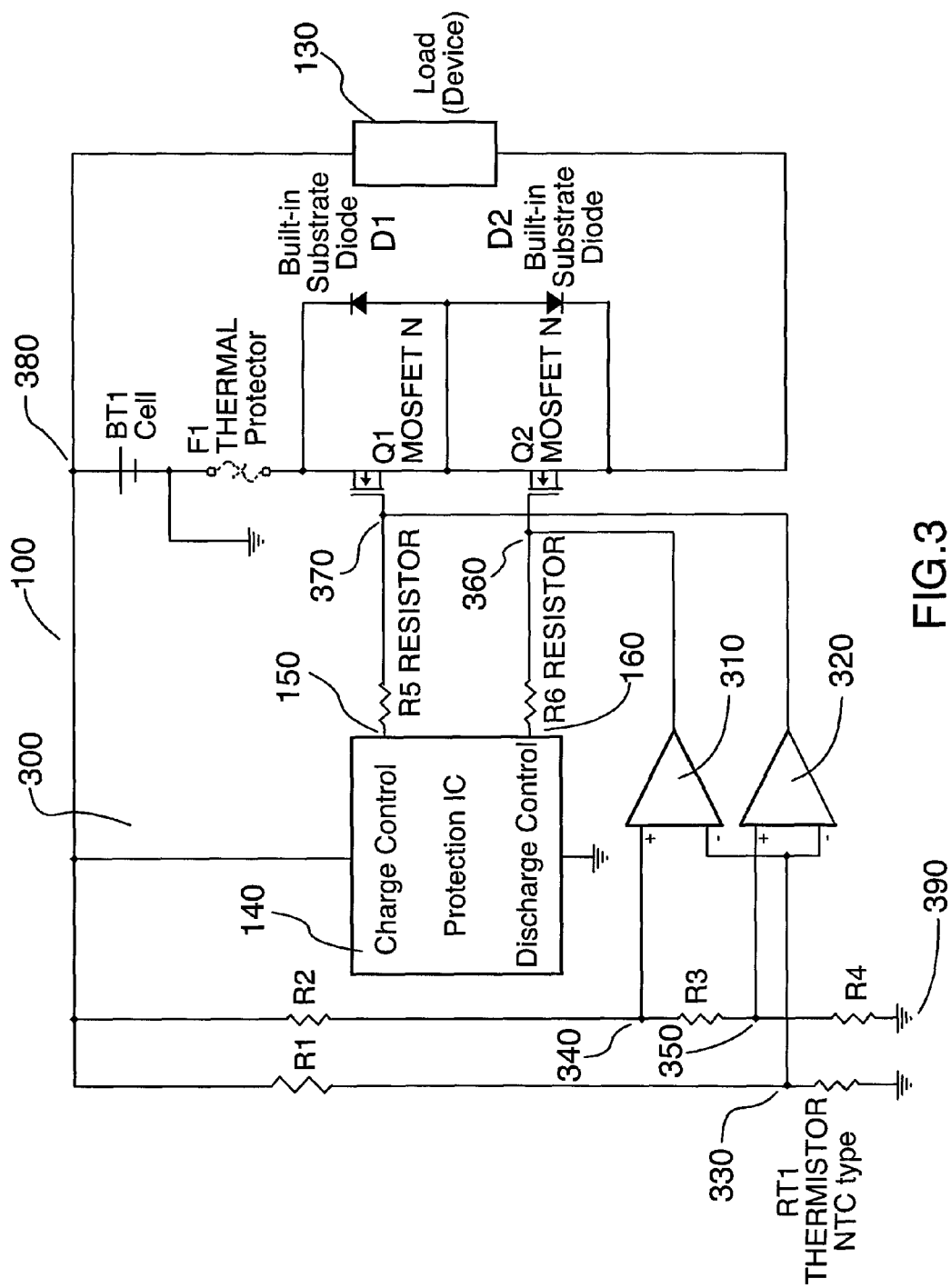
FIG. 3 is a circuit diagram illustrating a protection circuit for a battery pack in accordance with an embodiment of the application.

FIG. 3 is a circuit diagram illustrating a protection circuit 300 for a battery pack 100 in accordance with an embodiment of the application. The protection circuit 300 of the present application addresses the disadvantages described above. In particular, with the protection circuit 300 the battery pack 100 itself determines at what temperature range to allow charging and at what temperature range to allow discharging. Since these limits are set during the design of the pack 100, the limits that are set are always the proper ones for the pack 100. In addition, the protection circuit 300 is hardware-based and its incremental cost is low.

As with the protection circuit 120 of FIG. 1, in FIG. 3, the two MOSFETS Q1, Q2 (e.g., N-channel type) control access to the cell BT1. MOSFET Q1 is used to prevent charging the cell BT1 and MOSFET Q2 is used to prevent discharging the cell BT1. The MOSFETS Q1, Q2, in turn, are controlled by the protection IC 140 which detects fault conditions such as overcharge, over-current, and over-discharge. The protection circuit 300 of the present application may also include a thermal protector F1 as shown in FIG. 3. However, the thermal protector F1 is optional. It is not necessary but may be included if additional protection is desired.

In the protection circuit 300 of the present application, as shown in FIG. 3, a temperature-sensing device known as a thermistor RT1 is used together with first and second comparators 320, 310 (e.g., open collector or open drain comparators) to take over control of the MOSFETS Q1, Q2 when the respective thresholds or trip points of the comparators 320, 310 have been reached. The thermistor RT1 used in this embodiment is a negative temperature coefficient ("NTC") type. The resistance of a NTC type thermistor decreases as the temperature rises.

The thermistor RT1 is fed from a resistor R1 that is connected to the positive terminal 380 of the cell BT1. Thus, at the connection 330 of resistor R1 and the thermistor RT1, a voltage is produced that varies with the resistance of the thermistor RT1 and hence with the temperature of the cell BT1. The thermistor RT1 is located in close physical contact with the cell BT1 within the battery pack 100 allowing it to effectively read the temperature of the cell BT1.

Each comparator 310, 320 has one input (e.g., the negative "−" input) fed with this temperature dependent voltage 330. The other input (i.e., the positive "+" input) of each comparator 310, 320 is fed with a respective voltage tapped from connections 340, 350 between resistors R2, R3, R4 in a series connected resistor string (i.e., R2 to R3 to R4) that is connected between the positive terminal 380 of the cell BT1 and ground or common 390. The ratios of the resistors R2, R3, R4 set different threshold voltages 340, 350 to feed the positive inputs of the two comparators 310, 320. The outputs 360, 370 of the comparators 310, 320 are coupled to the gates of respective MOSFETs Q2, Q1 and to the respective discharge and charge control signal outputs 160, 150 of the protection IC 140 through respective resistors R6, R5.

When the cell temperature related voltage 330 across the thermistor RT1 drops below the cut-off temperature threshold voltage (e.g., 340) set for a given comparator (e.g., 310), the comparator 310 will turn on (i.e., its open collector or drain output transistor will turn on). When the comparator 310 turns on, it effectively takes over control of the MOSFET (e.g., Q2) that it is connected to, and thereby turns the MOSFET (e.g., Q2) off. This occurs regardless of what the protection IC 140 does. As a result, the protection IC 140 and the comparators 310, 320 share control of the MOSFETS Q1, Q2 allowing either the protection IC 140 or the comparators 310, 320 to prevent charging or discharging of the cell BT1. Thus, a simple change in the ratio of the resistors R2, R3, R4 will accommodate cells BT1 requiring different discharge and charge cut-off temperature threshold voltages 340, 350.

Thus, the ratio of values of resistors R2, R3, and R4 adjusts the discharge and charge cut-off temperature thresholds which are represented by voltages at connections 340 and 350, respectively. In FIG. 3, the discharge cut-off temperature threshold voltage 340 is higher than the charge cut-off temperature threshold voltage 350, which is the typical case. The comparators 310, 320 (e.g., open-collector comparators) have no effect on the normal operation of the protection IC 140. However, when a comparator's cut-off temperature threshold voltage (e.g., voltage 340 for comparator 310) is reached or passed, the comparator 310 will take over control of its associated MOSFET (e.g., MOSFET Q2 for comparator 310) regardless of the state of the output (e.g., output 160) of the protection IC 140. Depending on which comparator 310, 320 is active, either the charging 170 or the discharging 180 of the cell BT1 will be inhibited.

According to one exemplary embodiment, charging should not occur at cell temperatures above about 45° C. Thus, a typical charge cut-off temperature threshold may range from 40° C. to 45° C. In addition, discharging should not occur at cell temperatures above about 65° C. Thus, a typical discharge cut-off temperature threshold may range from 60° C. to 65° C. As such, the components of the protection circuit 300 may be selected as follows:

MOSFETs Q1, Q2: uPA2452 from NEC™ or ECH8601 from Sanyo™
Thermistor RT1: TH05-3I473F (NTC) from Mitsubishi Materials Corp.
Comparators 310, 320: MAX9020 from Maxim Integrated Products, Inc.
Protection IC 140: MD160B14 from Hitachi™
Thermal protector F1: LiP77AY-01 from Takano™
Resistors R1, R2: 470 kΩ
Resistor R3: 9 kΩ for a 45° C. charge cut-off temperature threshold
Resistor R4: 14 kΩ for a 60° C. discharge cut-off temperature threshold
Resistors R5, R6: 10 kΩ
Diodes D1, D2: IN4148 or equivalent
Cell BT1: UF553450Z from Sanyo™

In the above example, a large value is chosen for resistor R1 so as to minimize current drain on the cell BT1. The current drain through resistor R1 should be limited to between 1 to 10 µA. Thus, a value of 470 kΩ is selected for resistor R1. Similarly, a value of 470 kΩ is selected for resistor R2. The value for resistor R4 is chosen to be approximately the same as the resistance of the NTC thermistor RT1 at the discharge cut-off temperature threshold. For example, from its application notes, the resistance of a TH05-3I473F NTC thermistor at 60° C. is 14 kΩ. Accordingly, a value of 14 kΩ is chosen for resistor R4 for a 60° C. discharge cut-off temperature threshold. The value of resistor R3 is calculated as the difference between the charge cut-off temperature threshold resistance value and the discharge cut-off temperature threshold resistance value. For example, from its application notes, the resistance of a TH05-3I473F NTC thermistor at 45° C. is 23 kΩ. Since the value of resistor R4 has already been determined to be 14 kΩ, the value of resistor R3 is 23 kΩ less 14 kΩ or approximately 9 kΩ. As this example shows, a straight forward method is used to calculate the resistance values (e.g., 9 kΩ and 14 kΩ) for resistors R3 and R4 that are required to generate the discharge and charge cut-off temperature threshold voltages 340, 350 for the comparators 310, 320.

Continuing with the above example, in a conventional protection circuit 120 for a battery pack 100, the thermal protector F1 has to be set at the discharge cut-off temperature threshold (e.g., 65° C.) plus an additional margin. The additional margin is required as tripping of the thermal protector F1 may have irreversible consequences (i.e., either permanent cut-off or degraded performance). Consequently, the thermal protector F1 is chosen to have a trip temperature (e.g., an over-temperature threshold) of approximately 85° C. to 95° C.

Figure 4:
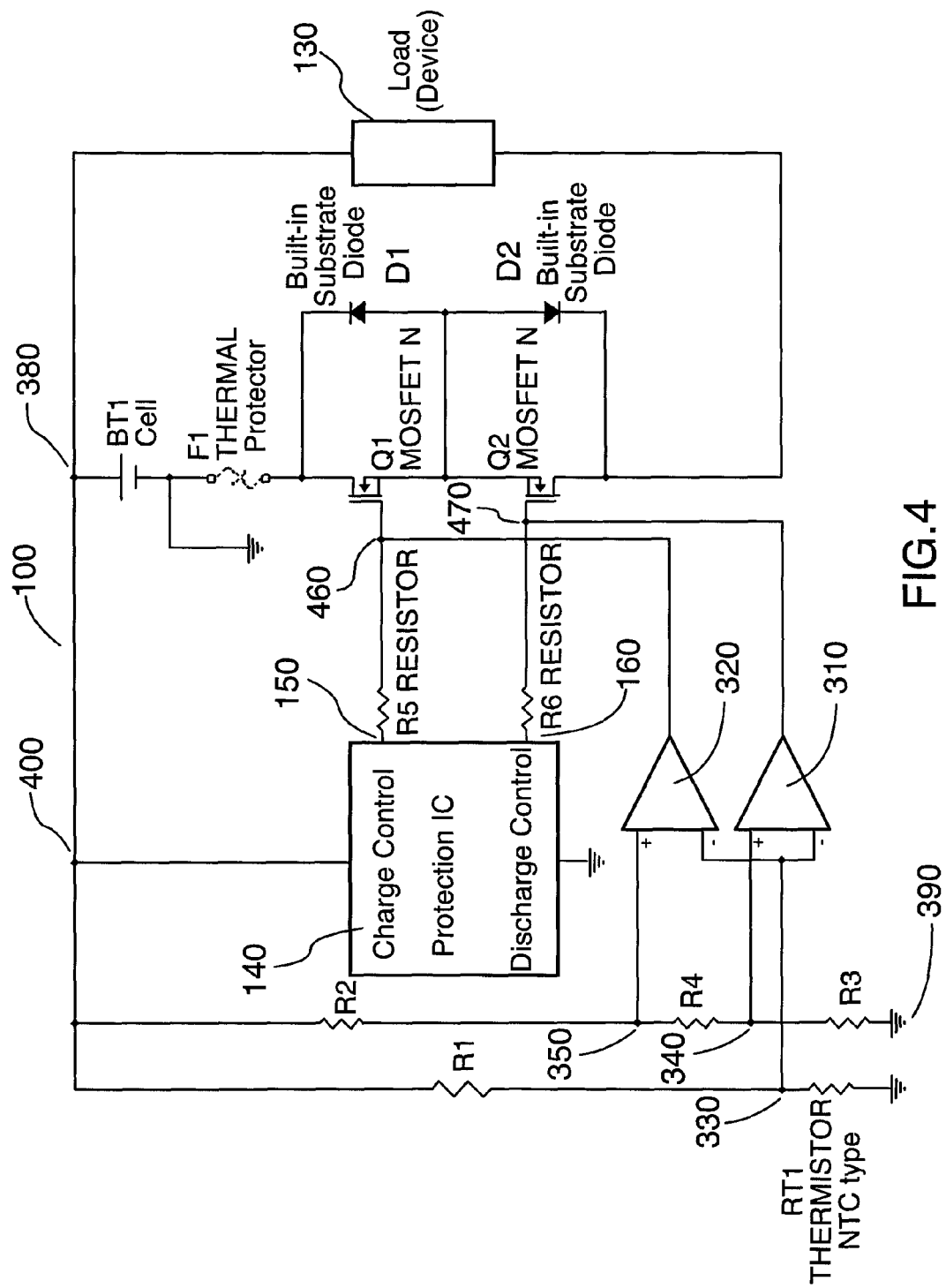
FIG. 4 is a circuit diagram illustrating a first alternate protection circuit for a battery pack in accordance with an embodiment of the application.

FIG. 4 is a circuit diagram illustrating a first alternate protection circuit 400 for a battery pack 100 in accordance with an embodiment of the application. In this protection circuit 400, the charge cut-off temperature threshold and voltage 350 is higher than the discharge cut-off temperature threshold and voltage 340. Consequently, the outputs 460, 470 of the comparators 320, 310 are coupled to the gates of respective MOSFETs Q1, Q2 and to the respective charge and discharge control signal outputs 150, 160 of the protection IC 140 through respective resistors R5, R6.

Figure 5:
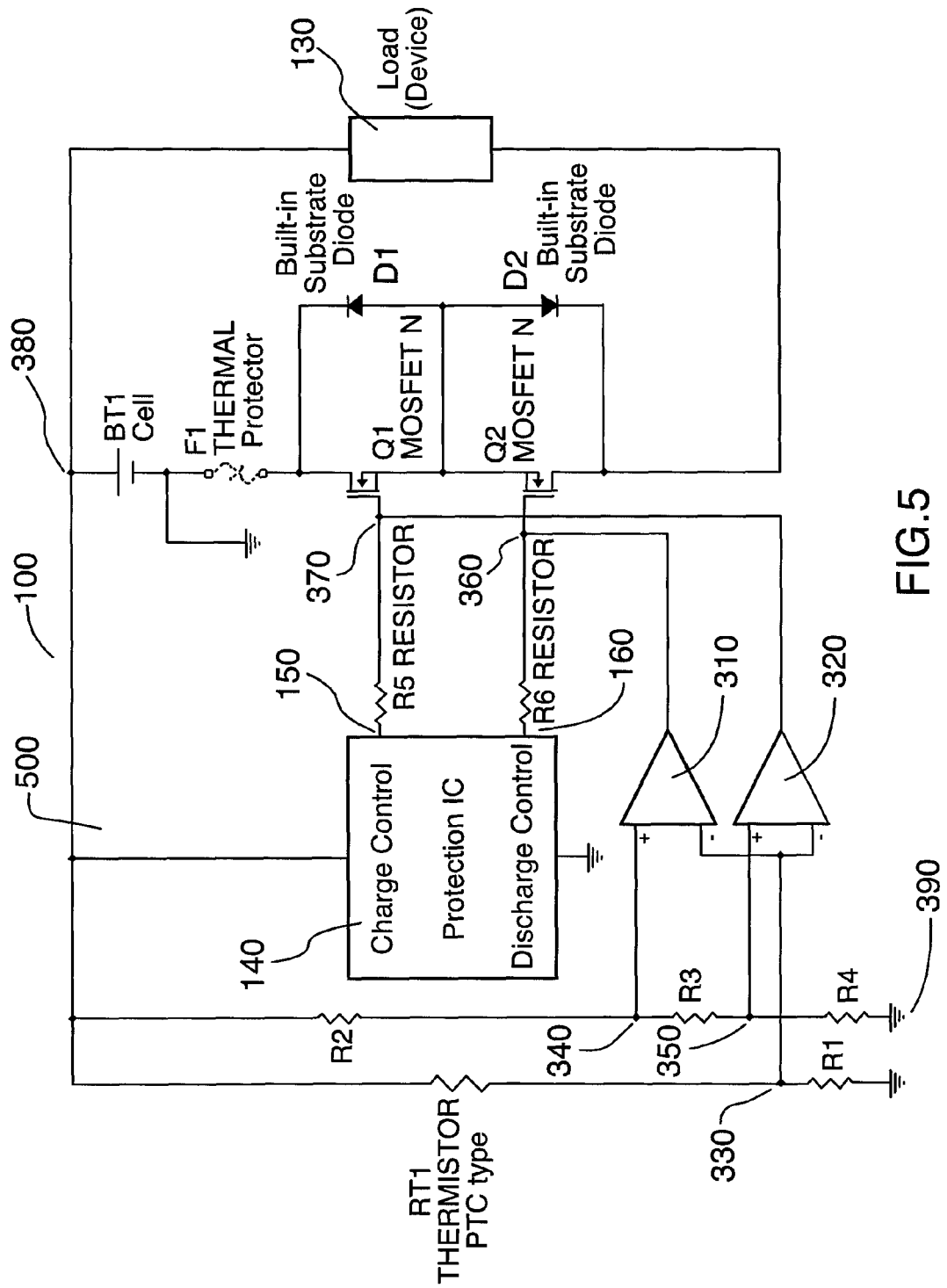
FIG. 5 is a circuit diagram illustrating a second alternate protection circuit for a battery pack in accordance with an embodiment of the application; and, FIG. 6 is a flowchart illustrating operations of the protection circuit of FIG. 3 in accordance with an embodiment of the application.

FIG. 5 is a circuit diagram illustrating a second alternate protection circuit 500 for a battery pack 100 in accordance with an embodiment of the application. In this protection circuit 500, the thermistor RT1 is of the positive temperature coefficient ("PTC") type and so its location and the location of resistor R1 in the circuit 500 are switched with respect to the protection circuit 300 of FIG. 3.

In each of the protection circuits 300, 400, 500 of FIGS. 3-5, control of the MOSFETS Q1, Q2 is assumed for the purpose of preventing charge or discharge based on crossing of predetermined charge and discharge cut-off temperature thresholds and voltages 350, 340.

Figure 6:
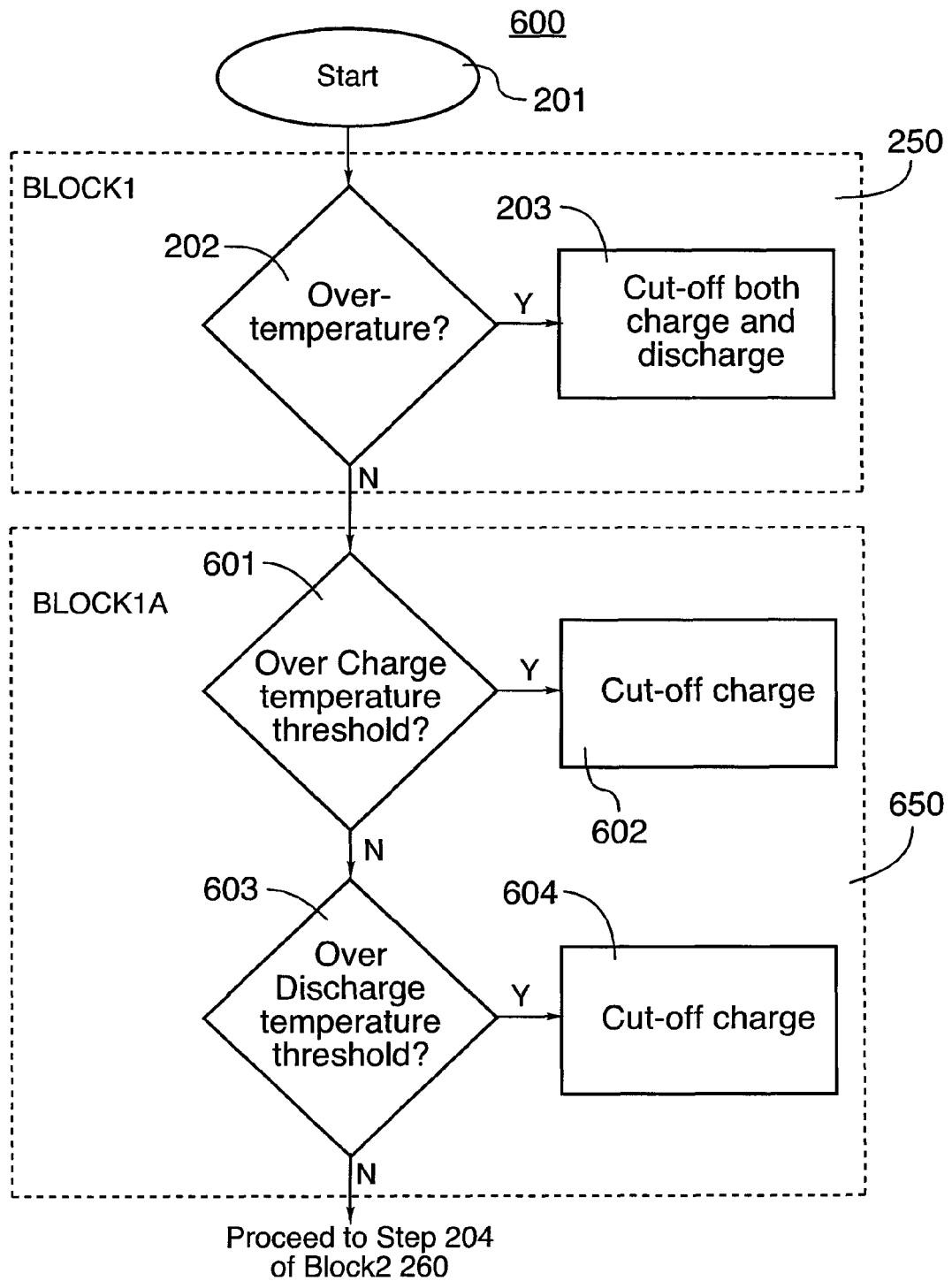

The above described protection circuit operations may be summarized with the aid of a flowchart. FIG. 6 is a flowchart illustrating operations 600 of the protection circuit 300 of FIG. 3 in accordance with an embodiment of the application. The operations 600 add a new block of operations Block1A 650 between blocks Block1 250 and Block2 260 shown in FIG. 2. The operations of Block1A 650 are performed by the comparators 310, 320, thermistor RT1, resistors R1-R6, and MOSFETs Q1, Q2 shown in FIG. 3. The operations of Block1 250 are performed by the thermal protector F1 and hence the MOSFETs Q1, Q2 are not used. As mentioned above, the thermal protector F1 is redundant in the protection circuits 300, 400, 500 of FIGS. 3-5 but may be left in place for additional protection. Similarly, the operations of Block1 250 are redundant but may be left in place for additional protection. The operations of Block2 260 are performed by the protection IC 140.

Continuing from step 202 of Block1 250 or from starting step 201, at step 601 of Block1A 650, a determination is made as to whether a charge cut-off temperature threshold has been exceeded.

At step 602, if the charge cut-off temperature threshold has been exceeded, then charging is cut-off (i.e., MOSFET Q1 is turned off).

At step 603, a determination is made as to whether a discharge cut-off temperature threshold has been exceeded.

At step 604, if the discharge cut-off temperature threshold has been exceeded, then discharging is cut-off (i.e., MOSFET Q2 is turned off). If the discharge cut-off temperature threshold has not been exceeded, then operations continue to step 204 of Block2 260.

Thus, according to one aspect of the application, and referring to FIG. 3, there is provided a protection circuit 300 for a battery pack 100, comprising: a thermistor RT1 for indicating a temperature of a cell BT1 in the battery pack 100; a first comparator 320 coupled to the thermistor RT1 for determining whether the temperature has exceeded a charge cut-off temperature threshold for the cell BT1, and if so, for turning off a first switch Q1 in series with the cell BT1 to prevent charging of the cell BT1; and, a second comparator 310 coupled to the thermistor RT1 for determining whether the temperature has exceeded a discharge cut-off temperature threshold for the cell BT1, and if so, for turning off a second switch Q2 in series with the cell BT1 to prevent discharging of the cell BT1.

The protection circuit 300 may further include first and second resistors R4, R3 coupled to the first and second comparators 320, 310, respectively, for establishing the charge and discharge cut-off temperature thresholds, respectively. The temperature may be a voltage indicative of the temperature 330, the charge cut-off temperature threshold may be a voltage indicative of the charge cut-off temperature threshold 350, and the discharge cut-off temperature threshold may be a voltage indicative of the discharge cut-off temperature threshold 340. The protection circuit 300 may further include an integrated circuit 140 having at least one of: a module for determining whether the cell BT1 has exceeded an over-voltage threshold, and if so, for turning off the first switch Q1; a module for determining whether the cell BT1 has exceeded an over-current threshold, and if so, for turning off the second switch Q2; and, a module for determining whether the cell BT1 has exceeded an over-discharge threshold, and if so, for turning off the second switch Q2. The protection circuit 300 may further include a thermal protector F1 in series with the cell BT1 for determining whether the cell BT1 has exceeded an over-temperature threshold for the cell BT1, and if so, for opening to prevent charging and discharging of the cell BT1. The thermal protector F1 may be a fuse. The first and second switches Q1, Q2 may be first and second metal-oxide semiconductor field-effect transistors ("MOSFETS"). The thermistor RT1 may be one of a negative temperature coefficient ("NTC") type thermistor and a positive temperature coefficient ("PTC") type thermistor. The cell BT1 may be one of a lithium ("Li-Ion") cell and a lithium-ion polymer cell. And, the battery pack 100 may be a battery pack for a wireless device 130, the protection circuit 300 may be included in the battery pack 100, and the thermistor RT1 may be in contact with the cell BT1.

The embodiments of the application described above are intended to be exemplary only. Those skilled in this art will understand that various modifications of detail may be made to these embodiments, all of which come within the scope of the application.

What is claimed is:

1. A protection circuit for a battery pack, comprising:
a thermistor for indicating a temperature of a cell in the battery pack;
a first comparator coupled to the thermistor for determining whether the temperature has exceeded a charge cut-off temperature threshold for the cell, and if so, for turning off a first switch to prevent charging of the cell;
a second comparator coupled to the thermistor for determining whether the temperature has exceeded a discharge cut-off temperature threshold for the cell, and if so, for turning off a second switch to prevent discharging of the cell; and,
first and second resistors coupled to the first and second comparators, respectively, for establishing the charge and discharge cut-off temperature thresholds, respectively;
wherein the thermistor is coupled to respective first inputs of the first and second comparators and to a first pull-up resistor or pull-down resistor; and,
wherein the first and second resistors are coupled to respective second inputs of the first and second comparators and to a second pull-up resistor.

2. The protection circuit of claim 1 wherein the temperature is a voltage indicative of the temperature, wherein the charge cut-off temperature threshold is a voltage indicative of the charge cut-off temperature threshold, and wherein the discharge cut-off temperature threshold is a voltage indicative of the discharge cut-off temperature threshold.

3. The protection circuit of claim 1 and further comprising an integrated circuit having at least one of: a module for determining whether the cell has exceeded an over-voltage threshold, and if so, for turning off the first switch; a module for determining whether the cell has exceeded an over-current threshold, and if so, for turning off the second switch; and, a module for determining whether the cell has exceeded an over-discharge threshold, and if so, for turning off the second switch.

4. The protection circuit of claim 1 and further comprising a thermal protector for determining whether the cell has exceeded an over-temperature threshold for the cell, and if so, for opening to prevent charging and discharging of the cell.

5. The protection circuit of claim 4 wherein the thermal protector is a fuse and wherein the thermal protector is in series with the cell.

6. The protection circuit of claim 1 wherein the first and second switches are first and second metal-oxide semiconductor field-effect transistors ("MOSFETS").

7. The protection circuit of claim 1 wherein the thermistor is one of a negative temperature coefficient ("NTC") type thermistor and a positive temperature coefficient ("PTC") type thermistor.

8. The protection circuit of claim 1 wherein the cell is one of a lithium ("Li-Ion") cell and a lithium-ion polymer cell.

9. The protection circuit of claim 1 wherein the battery pack is a battery pack for a wireless device, wherein the protection circuit is included in the battery pack, and wherein the thermistor is in contact with the cell.

10. The protection circuit of claim 1 wherein the first switch is in series with the cell, wherein the second switch is in series with the cell, wherein the first comparator is directly coupled to the first switch to affect control thereof, wherein the second comparator is directly coupled to the second switch to affect control thereof, and wherein the first and second resistors are in series with the second pull-up resistor.

11. A method for controlling charging and discharging of a battery pack, comprising:
  receiving from a thermistor a temperature of a cell in the battery pack;
  determining with a first comparator coupled to the thermistor whether the temperature has exceeded a charge cut-off temperature threshold for the cell, and if so, turning off a first switch to prevent charging of the cell;
  determining with a second comparator coupled to the thermistor whether the temperature has exceeded a discharge cut-off temperature threshold for the cell, and if so, turning off a second switch to prevent discharging of the cell; and,
  establishing the charge and discharge cut-off temperature thresholds with first and second resistors, respectively, coupled to the first and second comparators, respectively, wherein the thermistor is coupled to respective first inputs of the first and second comparators and to a first pull-up resistor or pull-down resistor, and wherein the first and second resistors are coupled to respective second inputs of the first and second comparators and to a second pull-up resistor.

12. The method of claim 11 wherein the temperature is a voltage indicative of the temperature, wherein the charge cut-off temperature threshold is a voltage indicative of the charge cut-off temperature threshold, and wherein the discharge cut-off temperature threshold is a voltage indicative of the discharge cut-off temperature threshold.

13. The method of claim 11 and further comprising at least one of: determining whether the cell has exceeded an over-voltage threshold, and if so, turning off the first switch; determining whether the cell has exceeded an over-current threshold, and if so, turning off the second switch; and, determining whether the cell has exceeded an over-discharge threshold, and if so, turning off the second switch.

14. The method of claim 11 and further comprising determining with a thermal protector whether the cell has exceeded an over-temperature threshold for the cell, and if so, opening the thermal protector to prevent charging and discharging of the cell.

15. The method of claim 14 wherein the thermal protector is a fuse and wherein the thermal protector is in series with the cell.

16. The method of claim 11 wherein the first and second switches are first and second metal-oxide semiconductor field-effect transistors ("MOSFETS").

17. The method of claim 11 wherein the thermistor is one of a negative temperature coefficient ("NTC") type thermistor and a positive temperature coefficient ("PTC") type thermistor.

18. The method of claim 11 wherein the cell is one of a lithium ("Li-Ion") cell and a lithium-ion polymer cell.

19. The method of claim 11 wherein the battery pack is a battery pack for a wireless device, wherein the protection circuit is included in the battery pack, and wherein the thermistor is in contact with the cell.

20. The method of claim 11 wherein the first switch is in series with the cell, wherein the second switch is in series with the cell, wherein the first comparator is directly coupled to the first switch to affect control thereof, wherein the second comparator is directly coupled to the second switch to affect control thereof, and wherein the first and second resistors are in series with the second pull-up resistor.

* * * * *